United States Patent
Li et al.

(10) Patent No.: US 9,946,113 B2
(45) Date of Patent: Apr. 17, 2018

(54) LIQUID CRYSTAL DISPLAY MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jingshi Li, Beijing (CN); Jian Sang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 294 days.

(21) Appl. No.: 14/388,667

(22) PCT Filed: Nov. 27, 2013

(86) PCT No.: PCT/CN2013/087978
§ 371 (c)(1),
(2) Date: Sep. 26, 2014

(87) PCT Pub. No.: WO2014/205999
PCT Pub. Date: Dec. 31, 2014

(65) Prior Publication Data
US 2016/0259208 A1    Sep. 8, 2016

(30) Foreign Application Priority Data

Jun. 27, 2013    (CN) .......................... 2013 1 0263672

(51) Int. Cl.
*G02F 1/1335*    (2006.01)
*F21V 8/00*    (2006.01)

(52) U.S. Cl.
CPC ..... *G02F 1/133606* (2013.01); *G02B 6/0008* (2013.01); *G02F 1/1336* (2013.01); *G02F 1/133524* (2013.01); *G02F 1/133603* (2013.01)

(58) Field of Classification Search
CPC ......... G02F 1/133606; G02F 1/133524; G02B 6/0008
See application file for complete search history.

(56) References Cited

U.S. PATENT DOCUMENTS 5,050,965 A * 9/1991 Conner ............... G02F 1/13473
349/112
6,469,834 B1   10/2002 Shahzad et al.
(Continued)

FOREIGN PATENT DOCUMENTS

CN            2615696 Y      5/2004
CN          202230284 U      5/2012
(Continued)

OTHER PUBLICATIONS

International Preliminary Report on Patentability dated Dec. 29, 2015; PCT/CN2013/087978.
(Continued)

*Primary Examiner* — Kendrick Hsu
(74) *Attorney, Agent, or Firm* — Ladas & Parry LLP; Loren K. Thompson

(57) ABSTRACT

A liquid crystal display module includes a liquid crystal panel and a backlight source; the liquid crystal panel includes an array substrate, the backlight source includes a plurality of scattering lenses, a plurality of optical pipes, and a light source; one side of each scattering lens is provided with a scatter surface, an end of each scattering lens away from the scatter surface is connected to an end of an optical pipe, the other end of the optical pipe is connected to the light source, and the scattering lens is used to scatter light (Continued)

passing through the optical pipe. A display device including the liquid crystal display module is further disclosed. The liquid crystal display module can improve the utilization ratio of light and reduce the power consumption.

15 Claims, 5 Drawing Sheets

(56) References Cited

U.S. PATENT DOCUMENTS

| | | | | |
|---|---|---|---|---|
| 8,545,078 | B2* | 10/2013 | Kim | F21S 11/00 362/1 |
| 2010/0214208 | A1* | 8/2010 | Itoh | G02B 6/0001 345/102 |
| 2012/0243252 | A1* | 9/2012 | Kim | F21S 11/00 362/554 |
| 2013/0155351 | A1* | 6/2013 | Garelli | G02B 6/001 349/64 |
| 2013/0170004 | A1* | 7/2013 | Futterer | G03H 1/0891 359/9 |
| 2014/0146268 | A1* | 5/2014 | Li | G02B 6/04 349/58 |

FOREIGN PATENT DOCUMENTS

| | | |
|---|---|---|
| CN | 103032817 A | 4/2013 |
| CN | 103047614 A | 4/2013 |
| WO | 2007/074784 A1 | 7/2007 |

OTHER PUBLICATIONS

International Search Report Appln. No. PCT/CN2013/087978; dated Mar. 13, 2014.
First Chinese Office Action dated Jul. 13, 2016; Appln. No. 201310263672.7.
Second Chinese Office Action dated Feb. 16, 2017; Appln. No. 201310263672.7.
The Third Chinese Office Action dated Aug. 24, 2017; Appln. 201310263672.7.

* cited by examiner

LIQUID CRYSTAL DISPLAY MODULE AND DISPLAY DEVICE

TECHNICAL FIELD

The present invention relates to a liquid crystal display technical field and particularly to a liquid crystal display module and a display device.

BACKGROUND

With the development of liquid crystal display technology, the requirements for a liquid crystal display module of a liquid crystal display in the aspects such as optical performance, utilization ratio of light, and power consumption have become higher and higher. A liquid crystal display module of an existing liquid crystal display uses a light guide plate type planar light source, which comprises the components such as a light guide plate, a reflective plate, a brightness enhancement film and so on; the existing liquid crystal display modules possess the disadvantages such as bad optical performance, low utilization ratio of light, and high cost for power consumption control, and cannot meet the above-mentioned high requirements.

SUMMARY

An embodiment according to the present invention provides a liquid crystal display module, which comprises a liquid crystal panel and a backlight source; the liquid crystal panel comprises an array substrate, and the backlight source comprises a plurality of scattering lenses, a plurality of optical pipes, and a light source; one side of each scattering lens is provided with a scatter surface, an end of each scattering lens, away from the scatter surface, is connected to one end of an optical pipe, and the other end of the optical pipe is connected to the light source; the scattering lenses are used to scatter light passing through the optical pipes.

Preferably, the array substrate comprises a plurality of pixel units and the scattering lens array is arranged on one side of the array substrate away from the pixel unit. In some embodiments, the side of the scatter surface of the scattering lenses contacts with the array substrate.

Preferably, the array substrate and the scattering lenses are provided with a light shielding section therebetween.

Preferably, each of the scattering lenses corresponds to at least one pixel unit in the array substrate.

Preferably, the light source comprises at least one light emitting diode, and each light emitting diode is connected to at least one of the scattering lenses.

Preferably, the optical pipes and the scattering lenses are connected in an insertion type connection mode.

Preferably, the scattering lens array is housed by a shell, and the optical pipes pass through the shell to connect to the light source.

Preferably, the optical pipes are flexible optical pipes.

An embodiment according to the present invention further provides a display device, which comprises any of the above-mentioned liquid crystal display modules.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DRAWING REFERENCE NUMBERS

101—scattering lens; 102—optical pipe; 103—light source; 104—array substrate; 105—light shielding section; 106—shell; 107—scatter surface; 108—optical pipe output terminal; 109—input terminal of optical pipe; 110—LED; 111—LED lamp cover.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
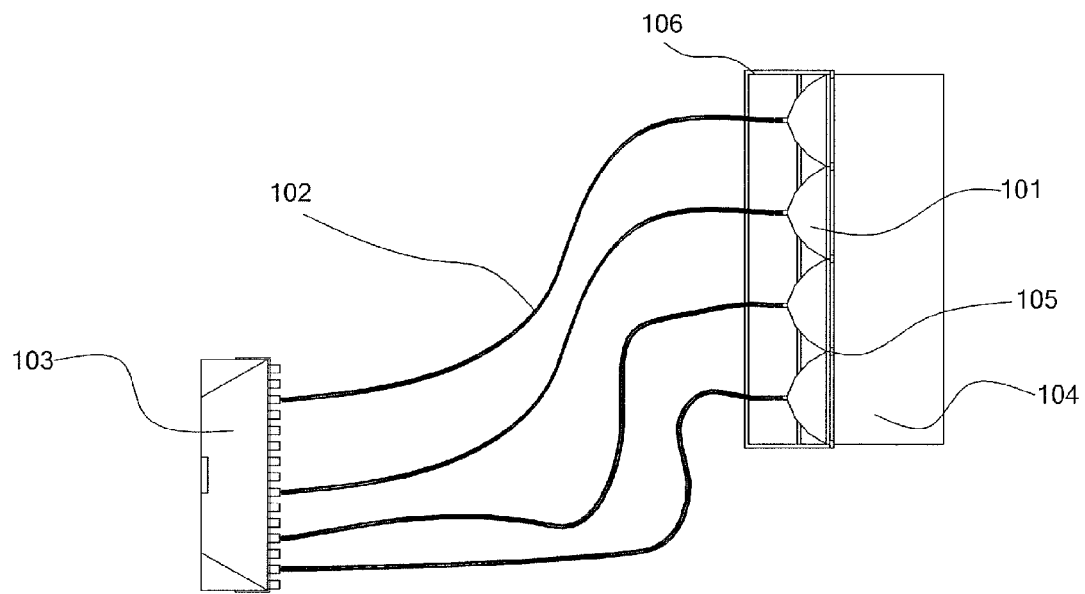
FIG. 1 is a structural schematic diagram of a liquid crystal module provided by an embodiment of the present invention.

An embodiment of the present invention provides a liquid crystal display module; as illustrated by FIG. 1, the liquid crystal display module comprises a liquid crystal panel and a backlight source. The liquid crystal panel comprises an array substrate 104. The backlight source comprises a plurality of scattering lenses 101, a plurality of optical pipes 102, and a light source 103. One side of the scattering lenses 101 is provided with a scatter surface, and the end of each one of the scattering lenses 101, away from the scatter surface, is connected to one end of the optical pipe 102. The other end of the optical pipe 102 is connected to the light source 103, and the scattering lenses 101 are connected to the light source 103 through the corresponding optical pipes 102. The light source 103 delivers light to every scattering lens 101 through an optical pipe 102 and the scattering lenses 101 are used to scatter the light passing through the optical pipes 102.

Preferably, the scattering lenses may be housed by a shell 106, and the optical pipes 102 pass through the shell 106 to be connected to the light source 103. Correspondingly, the light source 103 may be disposed within the shell 106 or disposed outside the shell 106.

Figure 2A:
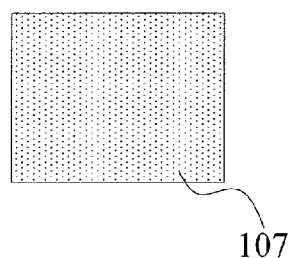
FIG. 2a is a front view of a scattering lens provided by an embodiment of the present invention.
Figure 2B:
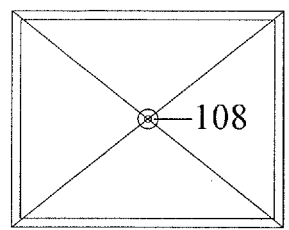
FIG. 2b is a back view of a scattering lens provided by an embodiment of the present invention.
Figure 2C:
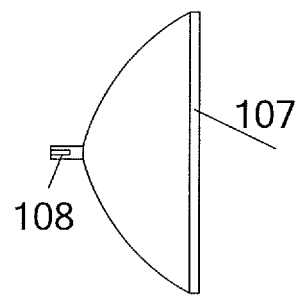
FIG. 2c is a side view of a scattering lens provided by an embodiment of the present invention.

FIG. 2 is a schematic diagram of a scattering lens provided in an embodiment of the present invention. A front view of the scattering lens is illustrated by FIG. 2*a*, and the front of the scattering lens is a scatter surface 107, which is used to provide a function of pulverizing light; a back view of the scattering lens is illustrated by FIG. 2*b*, and the back of the scattering lens is an optical pipe output terminal 108, i.e., a position of the back of the scattering lens to be connected with the optical pipe 102; a side view of the scattering lens is illustrated by FIG. 2*c*, and the scatter surface 107 of the scattering lens and the optical pipe output terminal 108 can be seen from the side view.

Figure 3A:
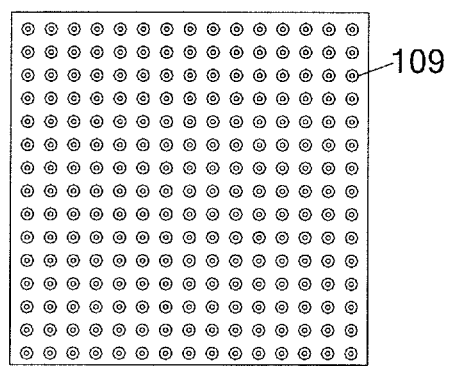
FIG. 3a is a front view of a LED light source provided by an embodiment of the present invention.
Figure 3B:
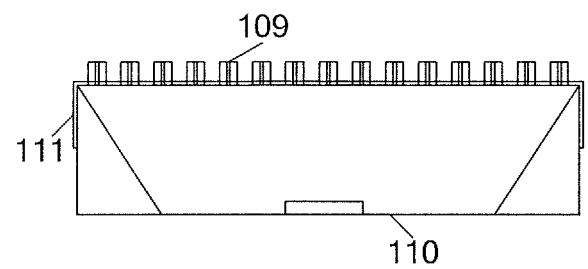
FIG. 3b is a side view of a LED light source provided by an embodiment of the present invention.

Preferably, the light source 103 comprises at least one light emitting diode (LED), and each of the light emitting diodes is connected to at least one of the scattering lenses 101. A front view of the LED light source 103 is illustrated by FIG. 3*a* and a side view is illustrated by FIG. 3*b*; an LED light source 103 comprises an LED 110, an LED lamp cover 111, and an optical pipe input terminal 109 disposed on the LED lamp cover 111; the optical pipe input terminal 109 is used to guide the light emitted from the LED in the form of a point light source, and the optical pipe input terminal 109 is the position of the LED light source 103 to be connected with the optical pipe.

Besides, referring to FIG. 1 again, the array substrate 104 of the liquid crystal panel comprises a plurality of pixel units, the scattering lenses 101 are arranged in an array on one side of the array substrate away from the pixel units, i.e., the other side of the substrate of the array substrate 104. The side of the scattering lens 101 where the scatter surface 107 is contacts with the array substrate.

Preferably, as illustrated by FIG. 1, the array substrate 104 and the scattering lenses 101 are provided with a light shielding section 105 therebetween. For example, positions where the array substrate and the scatter surface 107 of the scattering lens 101 contact each other may be provided with a light shielding section 105.

Figure 4:
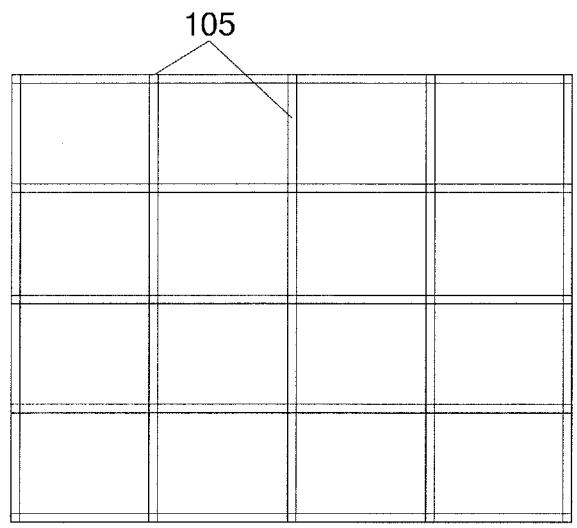
FIG. 4 is a structural schematic diagram of a light shielding section provided by an embodiment of the present invention.

Preferably, the light shielding section 105 may be formed by using a mask on the other side of the array substrate away from the pixel units; referring to the scattering lenses as illustrated by FIG. 4, the structure of the light shielding section 105 on the surface of the scattering lens can be clearly seen; the light shielding section 105 is disposed at the position where the scatter surface and the array substrate contact each other, so that light leakage can be avoided; the light shielding section 105 may be formed integrally with the scattering lenses.

Figure 5:
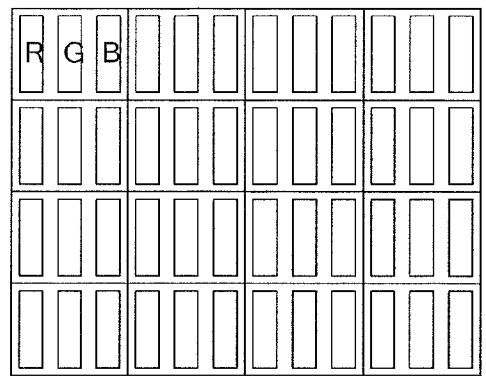
FIG. 5 is a schematic diagram of an array substrate provided by an embodiment of the present invention.

A schematic diagram of an array substrate provided by an embodiment of the present invention is illustrated by FIG. 5; the array substrate comprises a plurality of pixel units, and each pixel unit comprises three sub-pixel units of R (red), G (green), and B (blue).

Each scattering lens in the embodiment of the invention may only correspond to one pixel unit in the array substrate; certainly, it may also correspond to a plurality of pixel units in the array substrate; in specific practice, because the size of the pixel unit is relatively small, in order to facilitate manufacturing, the size of the scattering lens can be designed relatively big as long as it can guarantee the utilization ratio of light.

Figure 6:
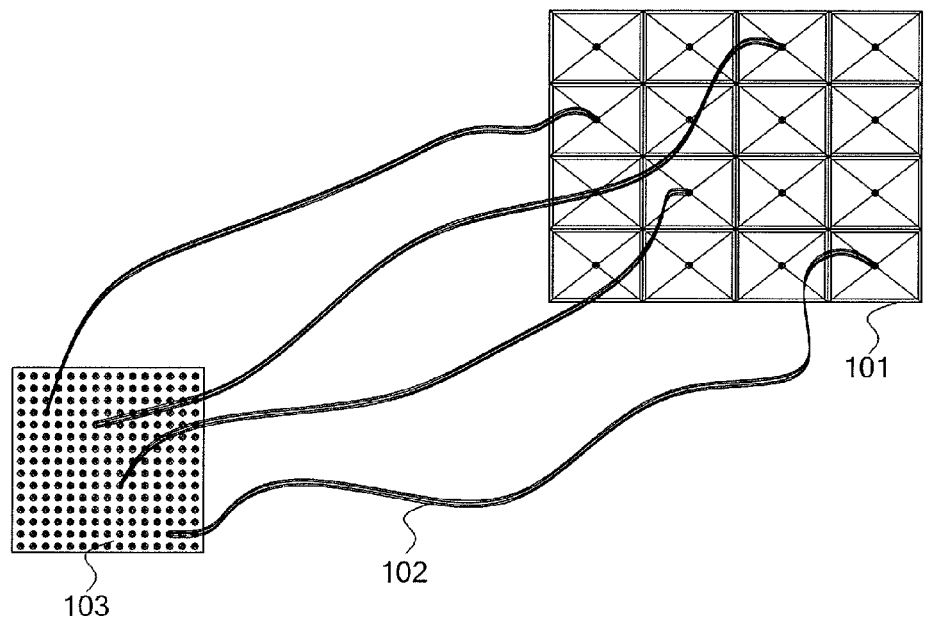
FIG. 6 is a schematic diagram showing that a single LED light source is connected to a plurality of scattering lenses in an embodiment of the present invention.

It should be noted that, corresponding to one backlight source, there may be one the light emitting diode or a plurality of the light emitting diodes, and selection can be conducted according to the size of the display device; one light emitting diode may be connected to one scattering lens only, i.e., one light emitting diode acts as the light source of one scattering lens, but the light emitting diode needs to be made enough small; light emitted from the light emitting diode can be totally delivered to the scattering lens through an optical pipe; certainly, one light emitting diode may also be connected to a plurality of scattering lenses, i.e., one light emitting diode acts as the light source of a plurality of scattering lenses. The schematic diagram showing that a single LED light source 103 is connected to a plurality of scattering lenses is illustrated by FIG. 6.

The optical pipes and the scattering lenses in the embodiment of the present invention may adopt an insertion type connection mode.

The structure of the scattering lens is relatively complex, the scattering lens may be formed by etching with a mask on the other side of the array substrate away from the pixel units, but the processes are very complex; the scattering lenses may also be formed separately, then the scattering lenses and the liquid crystal panel are fixed together by adhesive, socket, or the like as long as the pulverization function can be realized. The scatter surface may be realized by photolithograph, chemical etching or mechanical polishing; certainly, the substrate of the array substrate may be used to form the scatter surface of the scattering lens, and the scatter surface structure is formed on the surface of the array substrate away from the pixel units. The scattering lens of the present invention intends to cover the combination of the lens portion and the scatter surface that are separately formed.

Preferably, the optical pipes adopted in an embodiment of the present invention may be flexible optical pipes.

Figure 7:
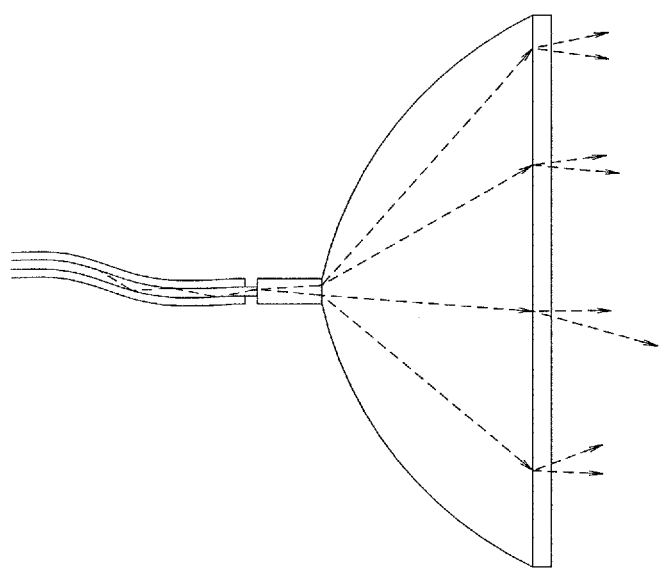
FIG. 7 is a schematic diagram showing that an optical pipe transmits light and scattering lenses scatters light in an embodiment of the present invention.

The schematic diagram showing the optical pipe transmits light and the scattering lens scatters light in an embodiment of the present invention is illustrated by FIG. 7. Light loss can be reduced and light utilization efficiency can be improved by guiding the light out of an LED light source in a point light source form, utilizing optical pipes to guide the light to every scattering lens of the liquid crystal display, and realizing the light pulverization function by the scattering lens.

An embodiment of the present invention further provides a display device comprising any of above-mentioned liquid crystal display modules.

To sum up, the embodiments of the present invention provide a light source for a liquid crystal display by utilizing optical pipes and scattering lenses and remove the structures such as a light guide plate, a reflective plate, and a brightness enhancing film, which not only simplifies the structure of a liquid crystal display module, lightens the weight of the liquid crystal display module, and satisfies the requirement of thinning the liquid crystal display module, but also realizes the purpose of reducing the power consumption of the liquid crystal display module.

What are described above is related to the illustrative embodiments of the disclosure only and not limitative to the scope of the disclosure; the scopes of the disclosure are defined by the accompanying claims.

The invention claimed is:

1. A liquid crystal display module, comprising a liquid crystal panel and a backlight source, wherein the liquid crystal panel comprises an array substrate, and the backlight source comprises a plurality of scattering lenses, a plurality of optical pipes, and a light source;
   wherein one side of each scattering lens is provided with a scatter surface, an end of each scattering lens away from the scatter surface is connected to an end of an optical pipe, the other end of the optical pipe is connected to the light source, and the scattering lens is configured to scatter light passing through the optical pipe and to obtain scattered light with more than one propagation direction which are not parallel with each other;

wherein the scatter surface of the scattering lens is in direct contact with the array substrate.

2. The liquid crystal display module according to claim 1, wherein the array substrate comprises a plurality of pixel units; and a scattering lens array is arranged on one side of the array substrate away from the pixel units.

3. The liquid crystal display module according to claim 2, wherein the array substrate and the scattering lenses are provided with a light shielding section therebetween; and the light shielding section is disposed at a position where adjacent scattering lenses contact with each other.

4. The liquid crystal display module according to claim 2, wherein each of the scattering lenses corresponds to at least one pixel unit in the array substrate.

5. The liquid crystal display module according to claim 1, wherein the light source comprises at least one light emitting diode; and each light emitting diode is connected with at least one of the scattering lenses.

6. The liquid crystal display module according to claim 1, wherein the optical pipes and the scattering lenses are connected in an insertion type connection mode.

7. The liquid crystal display module according to claim 1, wherein the scattering lenses are housed by a shell; and the optical pipes pass through the shell to be connected to the light source.

8. The liquid crystal display module according to claim 1, wherein the optical pipes are flexible optical pipes.

9. A display device, comprising the liquid crystal display module of claim 1.

10. The liquid crystal display module according to claim 1, wherein the array substrate and the scattering lenses are provided with a light shielding section therebetween.

11. The liquid crystal display module according to claim 1, wherein each of the scattering lenses corresponds to at least one pixel unit in the array substrate.

12. The liquid crystal display module according to claim 2, wherein the light source comprises at least one light emitting diode; and each light emitting diode is connected with at least one of the scattering lenses.

13. The liquid crystal display module according to claim 2, wherein the optical pipes and the scattering lenses are connected by an insertion type connection mode.

14. The liquid crystal display module according to claim 2, wherein the scattering lenses are housed by a shell; and the optical pipes pass through the shell to be connected to the light source.

15. The liquid crystal display module according to claim 2, wherein the optical pipes are flexible optical pipes.

* * * * *